United States Patent [19]
Arkans

[11] Patent Number: 6,062,244
[45] Date of Patent: May 16, 2000

[54] FLUIDIC CONNECTOR

[75] Inventor: Edward J. Arkans, Carlsbad, Calif.

[73] Assignee: ACI Medical, San Marcos, Calif.

[21] Appl. No.: 09/133,463

[22] Filed: Aug. 13, 1998

[51] Int. Cl.[7] ................................................ F16L 21/08
[52] U.S. Cl. .......................... 137/1; 137/594; 251/149.1
[58] Field of Search ................... 137/595, 1; 251/149.1, 251/149.2; 285/26, 29, 914

[56] References Cited

U.S. PATENT DOCUMENTS

| | | | |
|---|---|---|---|
| 3,516,492 | 6/1970 | Petersen . | |
| 4,156,425 | 5/1979 | Arkans | 128/24 |
| 4,253,449 | 3/1981 | Arkans et al. | 128/24 |
| 4,320,746 | 3/1982 | Arkans et al. | 128/24 |
| 4,624,244 | 11/1986 | Taberi | 128/24 |
| 4,753,268 | 6/1988 | Palau | 137/595 |
| 4,841,956 | 6/1989 | Gardner et al. | 128/64 |
| 4,938,208 | 7/1990 | Dye | 128/87 |
| 5,007,411 | 4/1991 | Dye | 128/64 |
| 5,117,812 | 6/1992 | McWhorter | 128/24 |
| 5,395,348 | 3/1995 | Ryan | 251/149.1 |
| 5,492,147 | 2/1996 | Challender et al. | 251/149.1 |

OTHER PUBLICATIONS

CPC Colder Products Company Catalog Quick Couplings and Fittings for Plastic Tubing Believed to be Jan. 1995.

CPC Colder Products Company Industrial Price List Mar. 1, 1997 Believed to be Jan. 1997.

*Primary Examiner*—Stephen M. Hepperle
*Attorney, Agent, or Firm*—Workman, Nydegger & Seeley

[57] ABSTRACT

An apparatus for ensuring proper engagement between connectors in external pneumatic compression devices. Two or more compression bladders are connected via tubing to a controller by a mated connector unit. Each mated connector includes an upstream portion and a downstream portion. The upstream portion includes a shut-off valve per individually addressed bladder. The downstream portion includes structure which defeats or opens the shut-off valve in the upstream connector and allows for fluid flow. Internally and externally, the mated connectors are configured for reciprocal engagement. Even if visual orientation of the connectors fails, the reciprocal structure of the connectors prevents incorrect engagement therebetween.

22 Claims, 7 Drawing Sheets

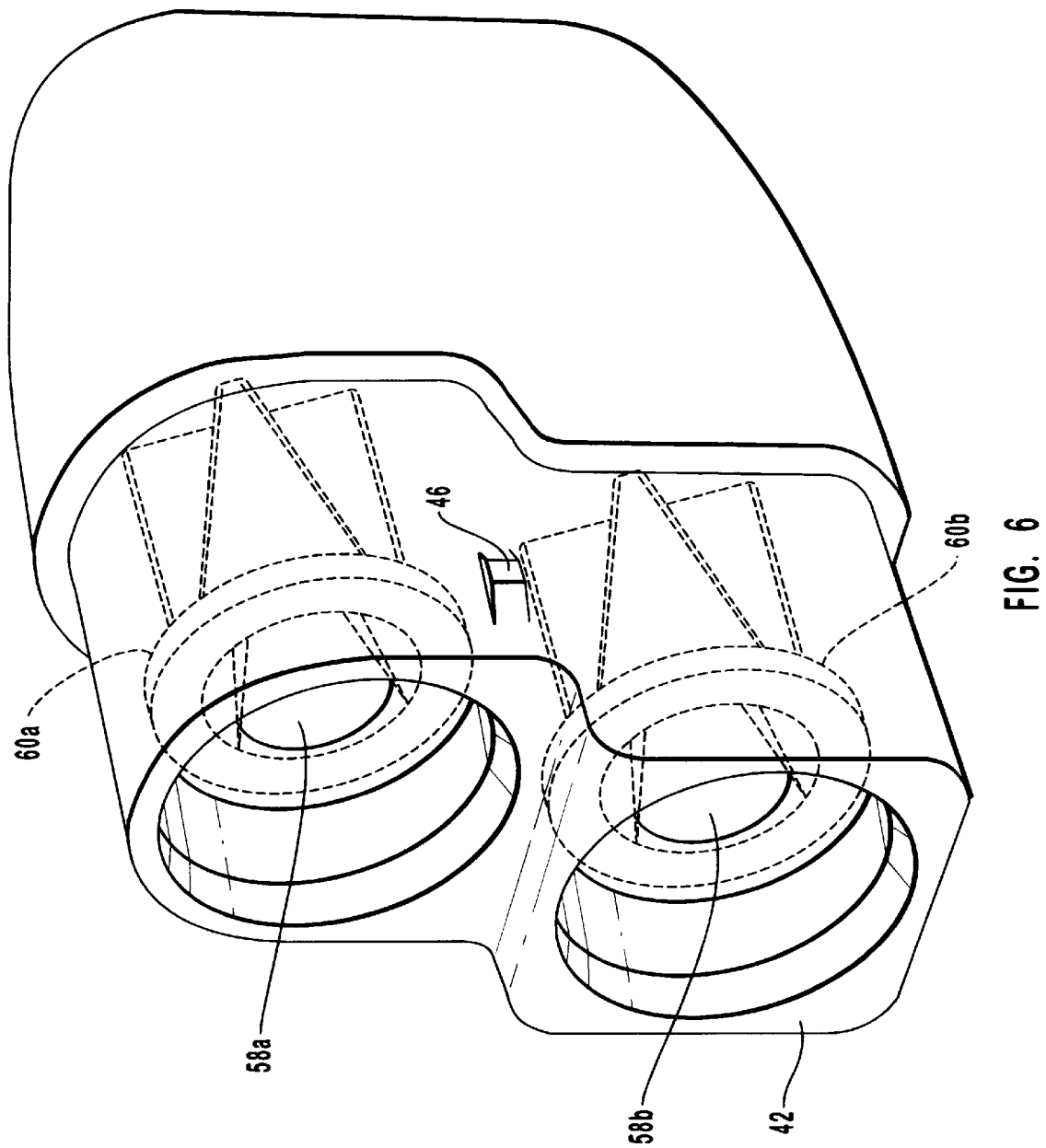

FLUIDIC CONNECTOR

BACKGROUND OF THE INVENTION

1. The Field of the Invention

The present invention is directed generally to methods and apparatus for providing fluidic connections. More specifically the present invention is related to methods and apparatus for pneumatic connectors for use in external pneumatic compression devices.

2. The Relevant Technology

External pneumatic compression devices (hereinafter, "EPC devices") apply compression to the limbs of patients suffering from impaired circulation. This impairment may be due to problems with the venous, arterial, lymphatic, or capillary components of the circulatory system, or from a combination of those components.

An important use of EPC devices is for the prevention of blood clots in the legs of patients. Blood clots in the legs can break loose, or "embolize," and block arterial supply to the lungs. If the blood clot blocks the main pulmonary artery leading from the heart to the lungs or if there are many clots, the condition is life-threatening. The EPC devices apply compression to the legs to disgorge stagnant blood and thus help to prevent the formation of blood clots. Cuffs are typically utilized to attach bladders to the patient's leg, and compression is applied by filling the bladders with fluid (typically air).

EPC devices typically have a controller unit that generates the pressurized fluid with a timing system that determines the filling and emptying cycles of the bladders. The controllers usually are powered by an electrical power main but may alternatively be powered by electrical batteries or compressed gas sources. Flexible fluid conduits such as hoses or tubing are used to connect the controller to the bladders. Pneumatic connections using the tubing are typically made between the tubing and the controller and between the tubing and the bladders.

Often the cuffs of the EPC devices have multiple bladders, such as one for each leg, or multiple bladders on a given leg. Certain conventional EPC devices apply pressure in a sequential or progressive manner whereby the most distal bladder attached to a patient's leg is inflated followed by the closest proximal bladder, and so on along the leg, proximally. When multiple bladders are used such as described above, it is important to ensure that the proper bladder is addressed by the controller to create the intended time variant pressure pattern along the limb. Improper connections of the tubing connecting each bladder to the controller will cause incorrect progressive or sequential compression along the limb. Thus, it is important that the connections not be confused.

EPC devices are used in hospitals and nursing homes wherein a variety of personnel including trained health care professionals are responsible for operating the device. However, for the convenience of the patient, EPC devices may also be utilized in the patient's home wherein the patient or the patient's family members may be responsible for operating the device. In turn, these inexperienced users may confuse the precise connections required for sequential or progressive compression along the limb. In turn, the convenience of home use may not impart beneficial therapy to the patient. In fact, with improper treatment, the patient may be in danger of experiencing the very serious problems associated with impaired circulation that the device was meant to prevent.

Further, once connected, conventional connectors can be difficult to disconnect. Although this secures the connections during use of the device, in the event of an emergency the connectors may fail to disconnect causing injury to the patient.

SUMMARY AND OBJECTS OF THE INVENTION

It is an object of the present invention to provide methods and apparatus for providing simple and effective connections between bladders and controllers in EPC devices.

Another object of the present invention is to provide methods and apparatus for connecting bladders and controllers in EPC devices to ensure that proper progressive or sequential compression is provided along the limb of a patient.

It is another object of the present invention to provide connectors which are easily operated by both medically trained and non-trained personnel.

It is still another object of the present invention to provide connectors which can be disconnected quickly and easily in the event of an emergency.

These and other objects and features of the present invention will become more fully apparent from the following description and appended claims, or may be learned by the practice of the invention as set forth hereinafter.

To achieve the forgoing objects, and in accordance with the invention as embodied and broadly described herein, the present invention relates to new and useful apparatus and methods for connecting compression bladders and controllers in EPC devices. The novel connectors of the present invention ensure that when multiple compression bladders are utilized in deep vein thrombosis therapy, the proper bladder is addressed by the proper controller to create an intended time variant pressure pattern along the limb of a patient. Specifically, the connectors of the present invention utilize reciprocal engagement to ensure proper orientation of mated connector halves. The reciprocal engagement is provided visually by the shape, physically by the feel and fit, and even audibly by the sound of the connector halves when mated properly. These unique reciprocal engagement elements preclude incorrect mating of the connector halves. Thus the connectors of the present invention ensure that progressive or sequential compression along the limb of a patient will occur as therapeutically intended and not reversed or out of order as would occur with incorrect connections.

In one embodiment of the present invention two compression cuffs are provided: one around the foot and the other around the calf of a patient. Each of these cuffs includes compressive bladders connected via tubing to a controller by a mated connector unit in accordance with the present invention. Each mated connector includes an upstream portion and a downstream portion. The upstream portion includes a shut-off valve for each individually addressed compression bladder. The downstream portion includes structure which opens the shut-off valve in the upstream connector and allows for fluid flow.

Alternatively, the present invention is directed to a connector unit which properly connects more than two compression bladders via tubing to a controller.

Alternatively, the bladders are directly connected to a controller by a mated connector unit in accordance with the present invention.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not to be considered to be limiting of its scope, the invention in its presently understood best mode for making and using the same will be described and explained with additional specificity and detail through the use of the accompanying drawings in which:

FIG. 6 is a partial perspective view of the upstream connector portion of the embodiment of the present invention illustrated in FIG. 2.

FIG. 7b illustrates in side cross-section the shut-off valve from FIG. 7a.

DETAILED DESCRIPTION OF THE PREFERRED EMBODIMENTS

When using external pneumatic compression devices during deep vein thrombosis therapy it is important to ensure proper connections between controllers and bladders such that an intended time and pressure variant scheme along a patient's leg is created. Improper connections between controllers and bladders can alter the scheme and frustrate the desired movement of blood. Conventional connections between a controller unit and limb bladders are easily confused. Typically, there are connections between the controller and the first set of connective tubing, between the first set of connective tubing and the second set, and between the second set of tubing and each bladder.

Figure 1:
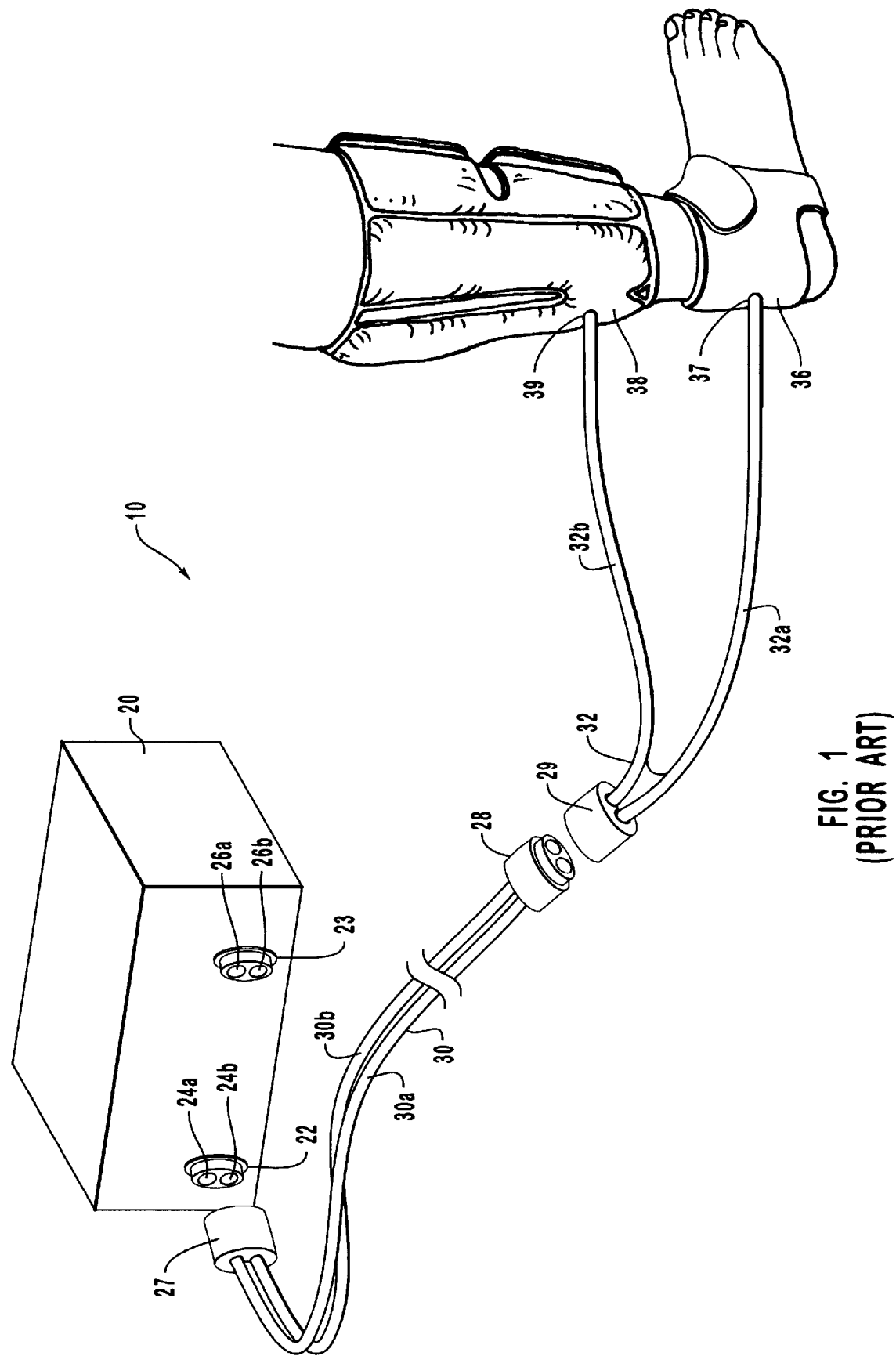
FIG. 1 is diagrammatic view of a conventional EPC device.

For example, a typical external compression device is illustrated generally by reference numeral 10 in FIG. 1. The EPC device includes an upstream controller unit, connectors, connective tubing, and downstream compressive bladders in the form of limb cuffs. As the terms will be used herein, "downstream" means in the direction away from the controller and toward the limb of a patient, and "upstream" means in the opposite direction.

The controller unit 20 maintains control over the fluid supply to and from the bladders for compression purposes. The controller unit comprises two upstream fluid output sets 22, 23, one for each leg (only one leg is illustrated). Other conventional EPC devices may comprise one, or three or more upstream fluid output sets depending upon the number of limbs being compressed.

Each upstream fluid output set further includes two output ports, 24a, 24b, 26a, 26b. Each output port supplies fluid for compression, such as from an internal pressure reservoir or an external compressed gas source, and is connected via connective tubing to an individual limb bladder. In the EPC device depicted in FIG. 1, output ports 24a and 24b supply two limb bladders: foot bladder 36 and calf bladder 38. Each output port is capable of supplying differential pressure to a limb bladder irrespective of the other output port and limb bladder combination.

It the embodiment depicted in FIG. 1, it is preferred that foot bladder 36 exert a greater pressure on the limb of a patient than calf bladder 38. A time variant scheme with the foot being pressurized prior to the calf is also preferred. One result of improper controller to bladder connections is that the calf bladder exerts a higher pressure prior to the foot which pushes the blood towards the foot, that is, opposite the direction desired for certain therapeutic purposes.

Fluid communication between the limb bladders and the output ports of the controller unit is accomplished via connective tubing sets 30 and 32. Each tubing set includes an individual tube (30a, 30b, and 32a, 32b) for addressing an individual output port and limb bladder. Upstream tubing 30a, 30b, connects to the output ports 24a, 24b of the controller unit via first connector 27. The upstream tubing set 30 and downstream tubing set 32 are connected via second connector 28 and third connector 29. Downstream tubing 32a, 32b connects to calf bladder 38 and foot bladder 36 via connectors 39 and 37 respectively.

Thus, it should be appreciated that there are numerous locations wherein the connections may be confused. This is further exacerbated because each connector 27, 28, 29 is identical to each other connector, which saves in manufacturing costs, tooling costs, and inventory costs. As a result, the same connection configuration is utilized for connecting each controller output port to each bladder, and thus the proper bladder to controller connection may be easily switched. In therapy using time-pressure variants this can result in improper compression providing little if any benefit to the patient.

In contrast, it is a feature of the present invention that the numerous connections between controllers, connective tubing, and bladders are incapable of being inadvertently misconnected. Specifically, the present invention is directed to methods and apparatus which simplify proper connection between cuff bladders and controllers and ensure that the appropriate bladder is addressed by the appropriate controller output.

For the purposes of the present discussion, only the connector units connecting upstream tubing and downstream tubing for EPC devices will be detailed. It will be appreciated that connections at the locations of the controller and the bladders also benefit from the apparatus of the present invention. Alternatively, direct controller to bladder connections are envisioned by the apparatus of the present invention.

Further, for illustration purposes, the following discussion is directed to an EPC device including two compression bladders, but it will be appreciated that one compression bladder or three or more compression bladders are within the scope of the present invention. In addition, it should also be appreciated that the unique connectors of present invention facilitate the use of compression bladders on multiple limbs of a single patient, or on multiple patients.

Figure 2:
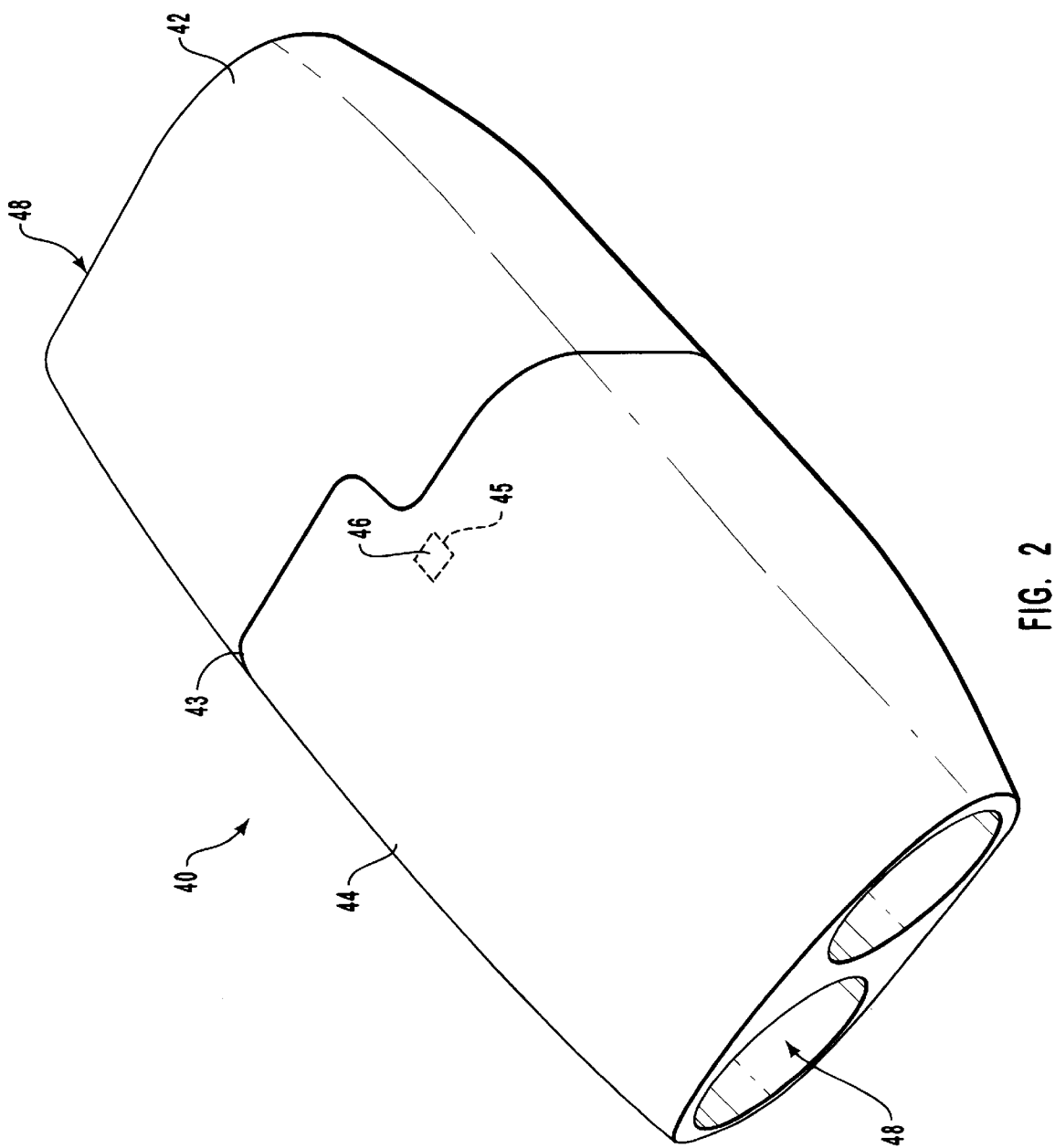
FIG. 2 is a partial perspective view of one embodiment of the present invention comprising a mated connector unit.

Turning to FIG. 2, a connector unit in accordance with the present invention is illustrated generally by reference number 40. Connector unit 40 comprises mated components: upstream connector 42 and downstream connector 44. In use, downstream connector 44 is coupled with tubing which connects to individual compression bladders, and upstream connector 42 is coupled with tubing which connects to a controller unit such as that described hereinabove with respect to FIG. 1. Arrows 48 illustrate the direction in which tubing is coupled with the downstream and upstream connector portions.

Figure 3:
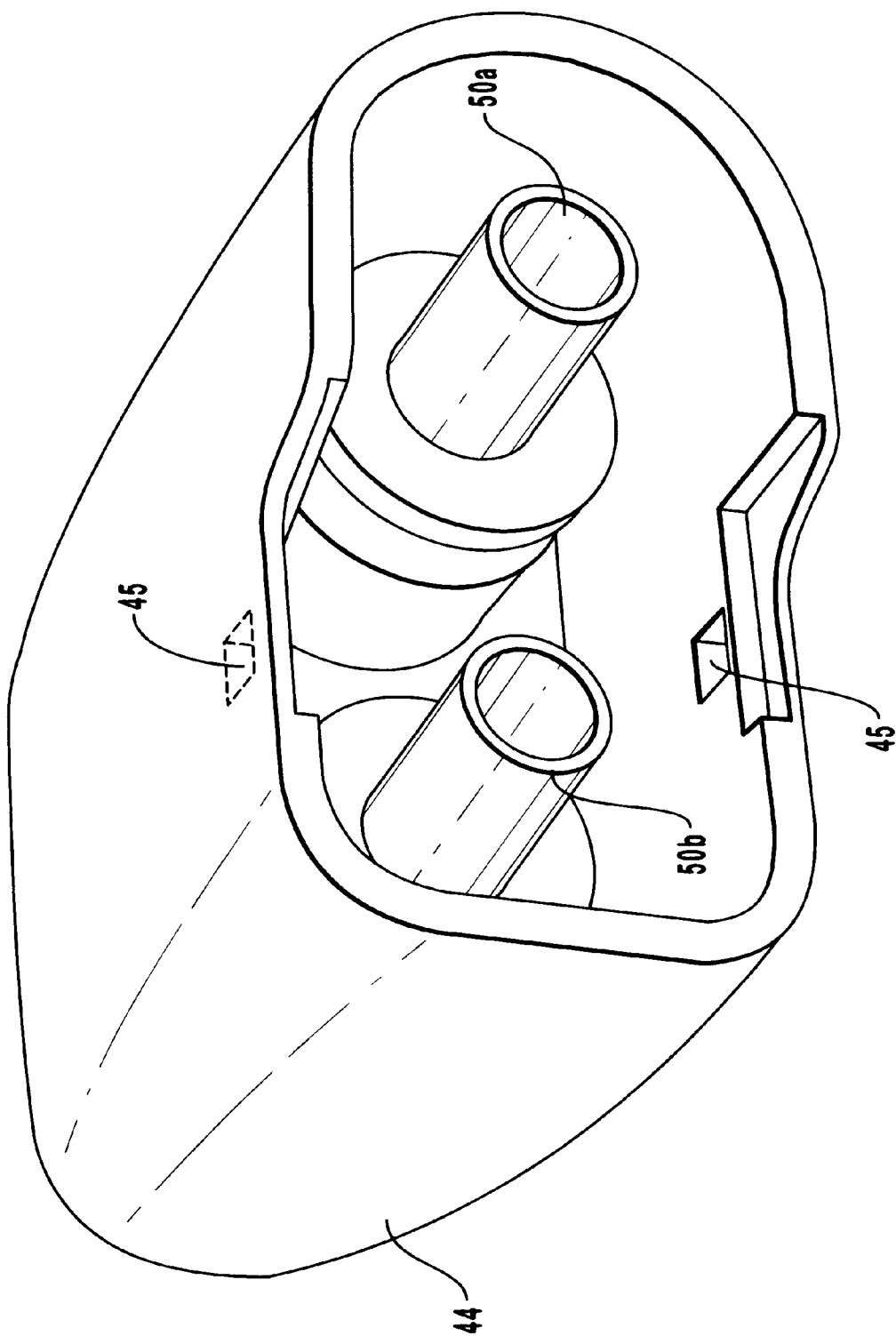
FIG. 3 is a partial perspective view of the downstream connector portion of the embodiment of the present invention illustrated in FIG. 2.

Downstream connector 44 is further illustrated in FIG. 3. Internally, downstream pneumatic tubes 50a, 50b can be seen extending through downstream connector 44. Preferably, the downstream pneumatic tubes are staggered in size which provides a unique internal connection with opposing elements in the upstream connector, to be described in more detail hereinbelow. By way of illustration, in FIG. 3, first downstream pneumatic tube 50a extends farther than second downstream pneumatic tube 50b. In this embodiment, the external configuration of downstream connector 44 is staggered correspondingly. It should be appreciated, however, that the external configuration of the downstream connector may be staggered oppositely from the downstream internal pneumatic tubes.

Figure 4B:
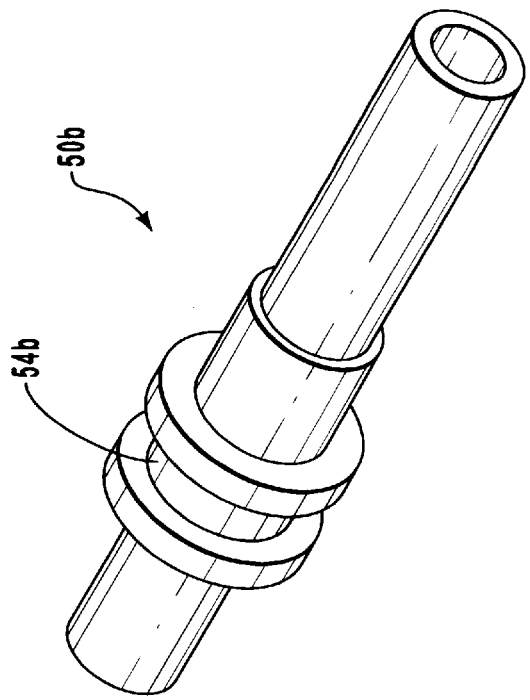
FIG. 4b is a partial perspective view of the second downstream pneumatic tube of the embodiment of the present invention illustrated in FIG. 3.
Figure 4A:
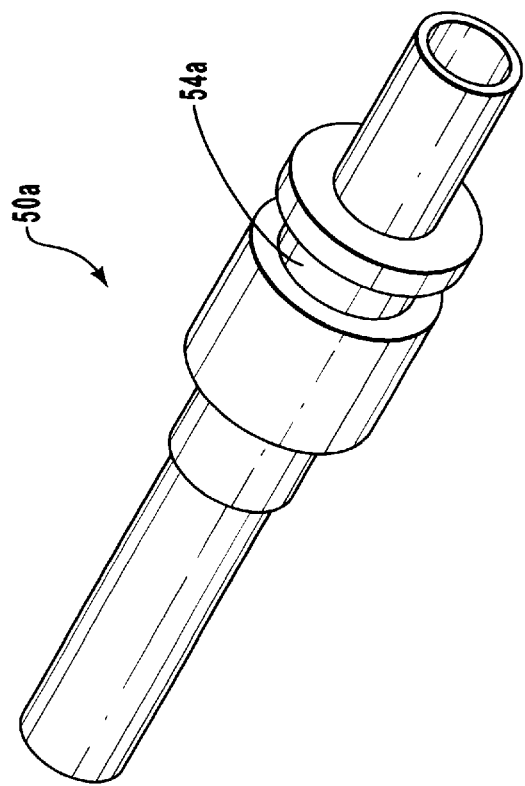
FIG. 4a is a partial perspective view of the first downstream pneumatic tube of the embodiment of the present invention illustrated in FIG. 3.
Figure 5:
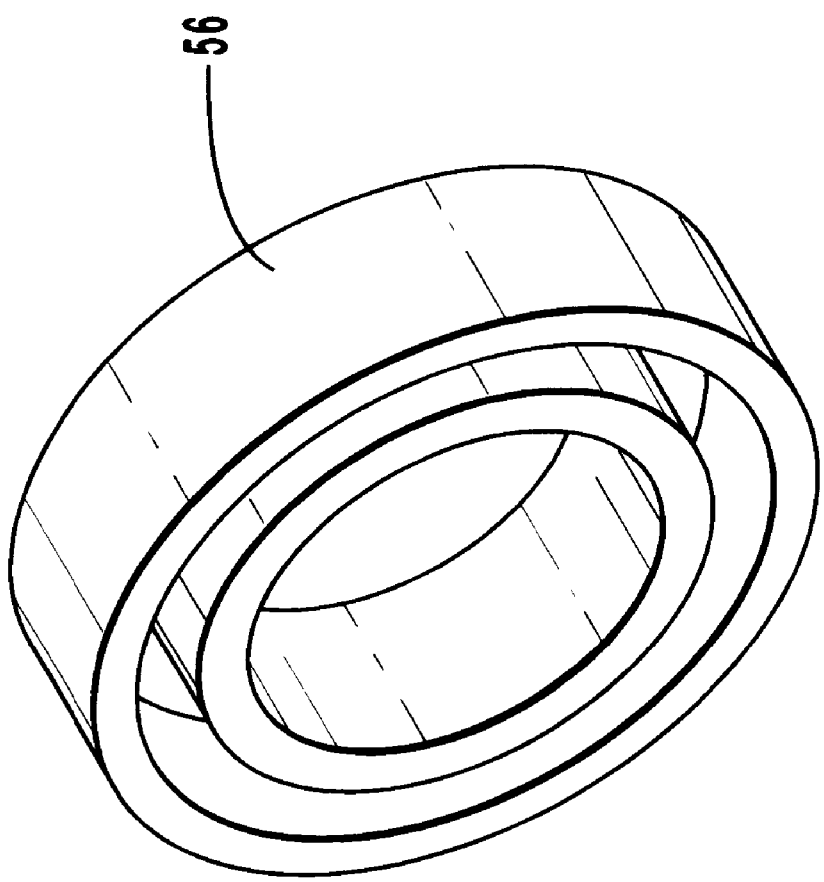
FIG. 5 is a partial perspective view of a U-cup seal in accordance with the present invention.

The downstream pneumatic tubes 50a, 50b are further illustrated in FIGS. 4a and 4b. Both downstream pneumatic tubes preferably comprise an annular recess 54a, 54b, for the inclusion of a seal, one example of which is U-cup 56, illustrated in FIG. 5. The U-cup aids in sealing of the connector as a whole and preferably comprises a pliant rubber material.

The downstream pneumatic tubes extend into and engage with the upstream connector 42 which is illustrated in partial perspective in FIG. 6. Ports 58a, 58b correspond in stagger to the pneumatic tubes 50a, 50b respectively, to provide a secure and unmistakable engagement. Further, the external configuration of upstream connector 42 is staggered accordingly.

Preferably, shut-off valves are positioned within the upstream connector. FIG. 6, for example, illustrates shut-off valves 60a, 60b. The shut-off valves occlude fluid flow when upstream connector is not connected to downstream connector, and thus preclude fluid flow prior to use as well as upon completion of therapy.

Figure 7B:
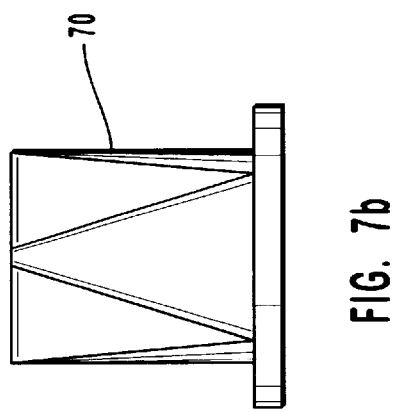
Figure 7D:
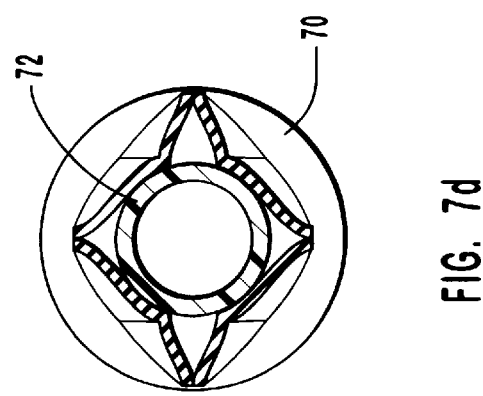
FIG. 7d is a cross section taken through line 7d—7d of FIG. 7c.
Figure 7A:
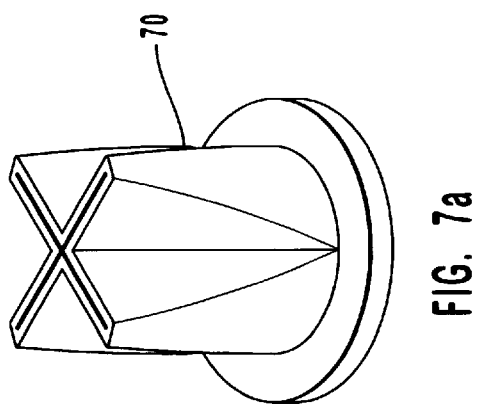
FIG. 7a is a partial perspective view of one preferred shut-off valve in accordance with the present invention.
Figure 7C:
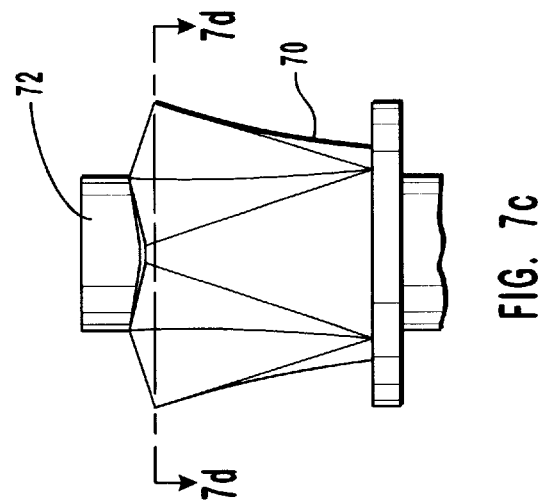
FIG. 7c illustrates the shut-off valve from FIG. 7b with a pneumatic tube extended therethrough.

Upon connection of the mated components, the downstream pneumatic connector tubes open the shut-off valves by interrupting the normally closed position of the valves. For example, one preferred shut-off valve 70 is illustrated in FIG. 7. Shut-off valve 70, illustrated in partial perspective in FIG. 7a, comprises multiple slits which are normally closed such that fluid flow therethrough is precluded. FIG. 7b illustrates in cross section that fluid does not flow through the slits. However, upon insertion of a pneumatic tube 72 such as from a downstream connector, the slits open thereby permitting fluid flow as illustrated in FIG. 7c. FIG. 7d, which is a cross section taken through line 7d—7d of FIG. 7c, illustrates the open shut-off valve 70 and the pneumatic tube 72.

Figure 8:
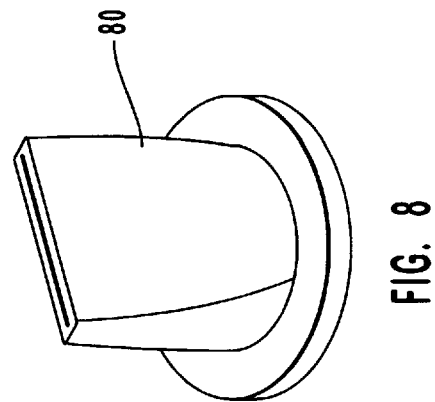
FIG. 8 is a partial perspective view of another embodiment of a shut-off valve in accordance with the present invention.

In an alternate embodiment of the present invention, FIG. 8 illustrates a shut-off valve 80 having a single slit. Preferably, the shut-off valve, multiple or single slit, comprises an elastomeric material such as silicon rubber, neoprene, other thermoset elastomers or thermoplastic elastomers. Alternatively, it will be appreciated that other valves can be utilized in accordance with the present invention. For example, a spring loaded disk or ball valve, or a flapper-type valve is utilized in accordance with the present invention.

As previously noted herein above, connections at the locations of the controller and the bladders also benefit from the apparatus of the present invention. The shut-off valves situated within the controller unit prevent discharge of pressurized fluid, such as from the internal pressure reservoir or the external compressed gas source, when the mated connectors are not connected, and in turn, enable the efficient use of the pressurized fluid in a controller unit with multiple ports at the times when not every port is used. In contrast, the conventional devices may waste pressurized fluid at any disconnected point along the device. For example, in the embodiment of a conventional device depicted in FIG. 1, pressurized fluid may escape through unused output ports, 26a, 26b, thereby depleting the pressure source available for deep vein thrombosis therapy.

The unique structure of the upstream and downstream connectors ensures proper engagement of these mated components and prevents inadvertent misconnections between them. In a presently preferred embodiment of the present invention, the configuration of the housing of the mated connectors forms an external reciprocal engagement. Engagement portion 43 in FIG. 2, illustrates that the housing of the mated components forms a step-like reciprocal engagement. This step-like shape of the external housing of the mated components cannot be connected absent proper orientation of the reciprocal "steps." The depicted step-like reciprocal external configuration is but one preferred embodiment of the present invention. It should be appreciated that other reciprocal configurations are envisioned by the apparatus of the present invention.

Internally, the upstream connector and downstream connector are also reciprocally mated. In a presently preferred embodiment of the present invention, the configuration of the pneumatic tubes and the shut-off valves forms an internal reciprocal engagement. FIGS. 3 and 6 illustrate that the internal configuration of the mated components also forms a step-like reciprocal engagement. As previously detailed hereinabove, the length of the pneumatic tubes is staggered in accordance with the external reciprocal configuration of the mated components. Further, the placement of the shut-off valves is also staggered accordingly. The reciprocal configuration of the pneumatic tubes and the shut-off valves ensures that the mated components cannot be connected absent proper orientation. The depicted internal reciprocal configuration is but one preferred embodiment of the present invention. It should be appreciated that other internal configurations are envisioned by the apparatus of the present invention.

In addition, the mated components preferably include keying mechanisms which provide tactile, visual, and/or audible confirmation of proper engagement of the mated components. For example, one preferred embodiment of the present invention includes a window-protuberance keying mechanism. In the presently preferred embodiment of the present invention, the upstream connector includes protuberance 46. The downstream connector includes a window 45 reciprocally corresponding to the protuberance of the upstream connector. FIG. 2 illustrates protuberance 46 through window 45 on the external surface of downstream connector 44. In one embodiment of the present invention, the protuberance and the external housing of the downstream connector comprise different colors such that the protuberance shows through the window in contrast to the external housing.

The window-protuberance keying mechanisms of the present invention provides visual, tactile, and audible confirmation of the proper orientation and connection of the mated components. The window of the downstream connector permits visual confirmation that the protuberance from the upstream connector is in place, especially if the protuberance shows through the window a different color than the downstream connector. In a tactile sense, an operator can feel the protuberance and the recessed window and align the mated connectors accordingly. Audibly, the protuberance clicks into position in the window, indicating that the mated connectors have been successfully engaged. It should be appreciated that one or more than one of such keying mechanisms can be located on the mated connectors.

It should be appreciated that the present invention is not limited to the keying mechanism described hereinabove. In an alternate embodiment of the present invention, the protuberance can be located on the downstream connector and the window, or alternatively, a recess, can be located on the upstream connector. Alternatively, multiple keying mechanisms can be utilized.

The unique external and internal configurations described hereinabove are presented as examples of reciprocal engagement means in accordance with the present invention. It will be appreciated that other reciprocal engagement means for ensuring proper engagement and preventing inadvertent misconnections between mated components are within the scope of the present invention.

The present invention is also directed to a method for using an EPC connector such as that described hereinabove. Upon proper placement of the cuffs of an EPC device, an operator preferably visually orients downstream and upstream connectors with respect to one another. Upon visual orientation, connection is accomplished quickly and easily. The connectors will not engage if they are not in proper orientation, thus, if visual orientation fails, there is no danger of improper connection. Once the connection is made, the shut-off valve is opened and fluid flow to the bladders can begin. Upon completion of the therapy, the connector unit is disconnected which ceases fluid flow by returning the shut-off valve to the closed position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for effecting fluidic connection, the apparatus comprising a downstream connector including at least one pneumatic connector tube and an upstream connector having at least one port having at least one shut-off valve configured for reciprocal engagement with the at least one pneumatic connector tube, thereby ensuring proper engagement and preventing inadvertent misconnections between the downstream and upstream connectors and forming a mated connector unit, wherein the shut-off valve comprises an elastomeric material.

2. The apparatus as recited in claim 1, wherein the shut-off valve comprises multiple slits.

3. The apparatus as recited in claim 1, further comprising at least one reciprocal keying mechanism.

4. The apparatus as recited in claim 3, wherein the keying mechanism comprises a protuberance on one of the upstream and downstream connector and a corresponding window on the other of the upstream and downstream connector.

5. An apparatus for effecting fluidic connection, the apparatus comprising a mated connector unit comprising:
   (a) a downstream connector comprising an external housing and a plurality of pneumatic connector tubes, the pneumatic connector tubes being staggered in length with respect to one another;
   (b) an upstream connector configured for reciprocal engagement with the downstream connector, the upstream connector comprising an external housing and a plurality of ports configured for reciprocal engagement with the pneumatic connector tubes, thereby being capable of precluding incorrect connection between the downstream and upstream connectors, the upstream connector further including a plurality of shut-off valves positioned within the ports, the shut-off valves permitting fluid flow upon insertion of the pneumatic connector tubes therethrough; and
   (c) at least one keying mechanism capable of providing confirmation of correct connection of the downstream and upstream connectors.

6. An apparatus as recited in claim 5, wherein said at least one keying mechanism provides tactile confirmation of proper connection between said downstream connector and said upstream connector.

7. An apparatus as recited in claim 5, wherein said keying mechanism comprises a protuberance on one of said downstream and upstream connector and a corresponding window on the other of said downstream and upstream connector.

8. An apparatus as recited in claim 5, wherein said at least one keying mechanism provides visual confirmation for proper connection between said downstream connector and said upstream connector.

9. An apparatus as recited in claim 5, wherein said at least one keying mechanism provides audible confirmation for proper connection between said downstream connector and said upstream connector.

10. A method for effecting proper engagement between fluidic connectors in external pneumatic compression devices, comprising the steps of:
   (a) obtaining at least two mated connectors having reciprocal engagement means having a reciprocal keying mechanism, at least one of the connectors being associated with a controller in an external pneumatic compression device, and at least one other of the connectors being associated with a compression bladder in an external pneumatic compression device, and wherein at least one of the connectors includes a plurality of pneumatic connector tubes staggered in length with respect to one another, and at least one other of the connectors including a plurality of ports having a plurality of shut-off valves disposed therein, the plurality of ports being configured for reciprocal engagement with the plurality of pneumatic connector tubes;
   (b) orienting the connectors using the reciprocal engagement means; and
   (c) engaging the connectors to form a mated connector unit such that a proper connection between the controller and the compression bladder is achieved.

11. A method as recited in claim 10, wherein said connectors have external housing configured for reciprocal engagement therebetween.

12. The method as recited in claim 10, wherein the keying mechanism comprises a protuberance on one of the connectors and a corresponding window on one other of the connectors.

13. The method as recited in claim 10, wherein the keying mechanism provides visual confirmation of proper engagement between the connectors.

14. The method as recited in claim 10, wherein the keying mechanism provides audible confirmation of proper engagement between the connectors.

15. The method as recited in claim 10, wherein the mated connectors facilitate the use of pneumatic compression bladders on more than one limb of a single patient or on the limbs of more than one patient at a time.

16. The apparatus as recited in claim 1, wherein the downstream and upstream connectors have external housings configured for reciprocal engagement therebetween.

17. The apparatus as recited in claim 5, wherein the external housing of the upstream connector and the external housing of the downstream connector are configured for reciprocal engagement with one another, thereby being capable of precluding inadvertent incorrect connection therebetween.

18. An apparatus for effecting fluidic connection, the apparatus comprising a downstream connector including at least one pneumatic connector tube and an upstream connector having at least one port having at least one shut-off valve configured for reciprocal engagement with the at least one pneumatic connector tube, thereby ensuring proper engagement and preventing inadvertent misconnections between the downstream and upstream connectors and forming a mated connector unit, wherein the shut-off valve comprises a multiple slits.

19. The apparatus as recited in claim 18, wherein the shut-off valve comprises an elastomeric material.

20. The apparatus as recited in claim 18, further comprising at least one reciprocal keying mechanism.

21. The apparatus as recited in claim 20, wherein the keying mechanism comprises a protuberance on one of the upstream and downstream connector and a corresponding window on the other of the upstream and downstream connector.

22. The apparatus as recited in claim 18, wherein the downstream and upstream connectors have external housings configured for reciprocal engagement therebetween.

* * * * *